Figure 1:
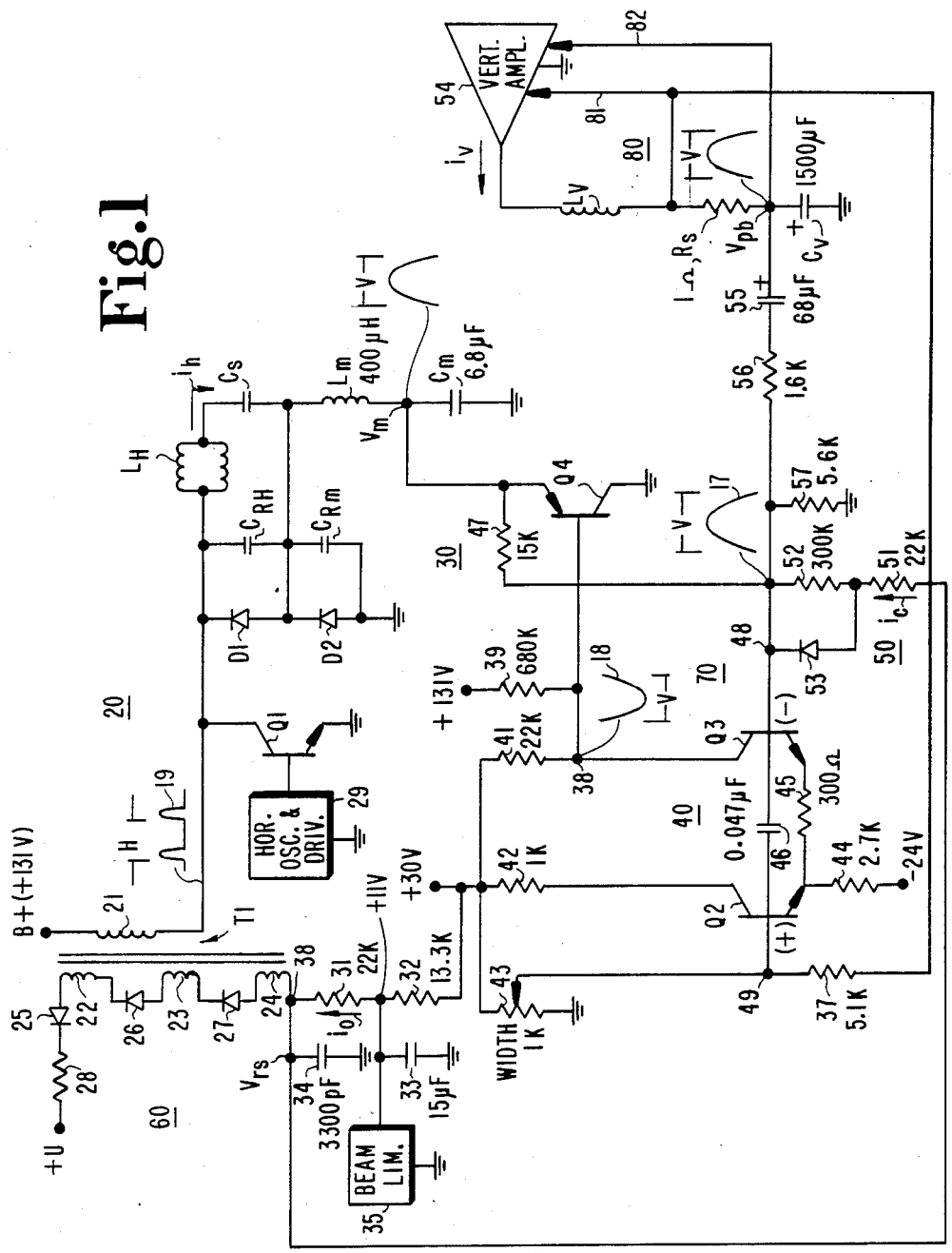

United States Patent [19]

Sutherland, II et al.

[11] Patent Number: 4,645,984

[45] Date of Patent: Feb. 24, 1987

[54] DIODE MODULATOR WITH RASTER WIDTH REGULATION

[75] Inventors: Hugh F. Sutherland, II, Indianapolis, Ind.; David W. Luz, Albuquerque, N. Mex.

[73] Assignee: RCA Corporation, Princeton, N.J.

[21] Appl. No.: 813,159

[22] Filed: Dec. 24, 1985

[51] Int. Cl.$^4$ .............................................. H01J 29/56
[52] U.S. Cl. ................................................... 315/371
[58] Field of Search ...................... 315/411, 371, 408

[56] References Cited

U.S. PATENT DOCUMENTS 4,309,640  1/1982  Gordon ................................ 315/371
4,469,992  9/1984  Favreau et al. ..................... 315/371

OTHER PUBLICATIONS

Thorn 9000 Series Colour Television Service Manual, Nov. 1975, p. 19.

Primary Examiner—Theodore M. Blum
Attorney, Agent, or Firm—Eugene M. Whitacre; Paul J. Rasmussen; Joseph J. Laks

[57] ABSTRACT

A high voltage generator develops an ultor voltage to accelerate an electron beam of a picture tube. The high voltage generator draws a resupply current in accordance with beam current loading by the picture tube. The deflection circuitry generates line and field deflection currents in respective line and field deflection windings to enable the electron beam to scan a raster. A diode modulator, including a differential amplifier input stage and an emitter-follower output stage, modulates the amplitude of the line deflection current to provide side pincushion correction. The voltage at a high voltage resupply current terminal of the high voltage generator is coupled in a nonlinear manner to the differential amplifier for nonlinearly modulating the amplitude of the line deflection current in accordance with beam current loading.

17 Claims, 4 Drawing Figures

DIODE MODULATOR WITH RASTER WIDTH REGULATION

This invention relates to raster width regulation and diode modulators which may be used in conjunction therewith.

Raster width is directly related to the amplitude of the line deflection current and inversely related to the square-root of the ultor voltage. The high voltage generator of the ultor voltage exhibits an internal impedance which decreases the ultor voltage as the picture tube draws increasing beam current.

To regulate the width of the raster under varying ultor load, the amplitude of the line deflection current is concurrently varied. A beam current representative or sense voltage is applied to the control circuit of a deflection current modulation means, such as a B+ regulator or a side pincushion modulator. The sense voltage enables the modulation means to vary either the B+ voltage or the the side pincushion correction of the line deflection current in accordance with beam current loading.

It is known to apply the beam current sense voltage to the control circuit of the B+ regulator or of the side pincushion modulator in a linear manner for width regulation purposes. The internal impedance of the high voltage generator, however, is nonlinear with beam current loading. A the lower beam current loading levels, the internal impedance of the high voltage generator is greater than at the higher beam current loading levels. Thus, the ultor voltage does not decrease in a linear manner as beam current loading on the high voltage generator increases. Applying the beam current sense voltage to the modulation means of the line deflection circuit in a linear manner, therefore, does not produce completely accurate width regulation across the entire range of normal beam current loading levels.

In accordance with an inventive feature, accurate width regulation is provided both at low beam current loading levels and at high beam current loading levels. A high voltage generator develops an ultor voltage to accelerate an electron beam of a picture tube. The high voltage generator draws a resupply current in accordance with beam current loading. Deflection circuitry generates line and field deflection currents in respective line and field deflection windings to enable the electron beam to scan a raster. A modulator provides amplitude modulation of the line deflection current. A sense voltage representative of the resupply current is generated. A correction circuit responsive to the sense voltage and coupled to the modulator generates a nonlinear correction signal to provide modulation of the amplitude of the line deflection current that is greater within a first range of normal beam current loading than within a second range.

In accordance with another aspect of the invention, the modulation means for the line deflection current comprises a diode modulator of high stability that is capable of accurately modulating the amplitude of the line deflection current in response to various input signals that are applied to the control circuit of the diode modulator. The diode modulator includes a modulator trace capacitance coupled to the horizontal deflection circuit for modulating the amplitude of the horizontal deflection current. The control circuit for the diode modulator comprises first and second differentially coupled transistors forming a differential amplifier having an inverting input terminal at the base terminal of one of the two transistors and a noninverting input terminal at the base terminal of the other transistor. A noninverting, unity voltage gain, emitter-follower stage shunts the modulator trace capacitance. The emitter-follower stage includes a third transistor having an emitter terminal coupled to the modulator trace capacitance and a base terminal coupled to an output of the differential amplifier at a collector terminal of the first transistor. A vertical rate parabola voltage generator coupled to one of the input terminals of the differential amplifier varies the voltage of the modulator capacitance at a vertical rate in a parabolic manner to similarly modulate the horizontal deflection current for providing side pincushion correction.

To provide accurate width regulation, a correction current, representative of beam current loading, is coupled to an input terminal of the differential amplifier for modulating the amplitude of the horizontal deflection current in accordance with the correction current.

FIG. 1 illustrates deflection circuitry with a diode modulator that provides raster width regulation, embodying the invention; and FIG. 2 illustrates curves associated with the operation of the circuitry of FIG. 1.

In FIG. 1, a B+ voltage terminal is coupled to a horizontal deflection circuit 20 via the primary winding 21 of a flyback transformer T1. Horizontal deflection circuit 20 includes a horizontal oscillator and driver circuit 29, a horizontal output transistor Q1, a damper diode D1, a deflection retrace capacitor $C_{RH}$, and the series arrangement of a horizontal deflection winding $L_H$ and an S-shaping capacitor $C_S$. A side pincushion correction circuit 30 is coupled to horizontal deflection circuit 20 for modulating the amplitude of horizontal deflection current $i_H$ in a manner that provides side pincushion correction to the raster.

Side pincushion correction circuit 30 comprises a diode modulator including a second damper diode D2, a modulator retrace capacitor $C_{Rm}$, and the series arrangement of a modulator inductor $L_m$ and a modulator trace capacitor $C_m$. A control circuit 70 of diode modulator 30 inculdes an output stage transistor Q4 that shunts modulator capacitor $C_m$. Control circuit 70 further includes an input stage differential amplifier 40 comprising differentially coupled transistors Q2 and Q3 having their emitters coupled together via a resistor 45. The emitter of transistor Q2 is coupled to a −24 volt supply via a resistor 44, and the collector is coupled to a +30 volt supply via a resistor 42.

The output of differential amplifier 40 at a collector terminal 38 of differential transistor Q3 is coupled to the base of diode modulator output transistor Q4. The base of differential transistor Q3, therefore, comprises an inverting input terminal 48 of differential amplifier 40, whereas the base of differential transistor Q2 comprises a noninverting input terminal 49. A capacitor 46 is coupled between the two input terminals of differential amplifier 40 to provide high frequency common mode rejection.

To provide side pincushion correction, a vertical rate parabola voltage $V_{pb}$ is AC coupled via a DC blocking capacitor 55 and a resistor 56 of voltage dividing resistors 56 and 57 to inverting input terminal 48 of differential amplifier 40. Vertical parabola voltage $V_{pb}$ is generated across an S-shaping capacitor $C_V$ of a vertical deflection circuit 80. Vertical deflection circuit 80 comprises a vertical deflection amplifier 54 coupled to a vertical deflection winding $L_V$ for generating a vertical deflection current $i_V$. Vertical deflection current $i_V$ flows in vertical deflection winding $L_V$, a sampling resistor $R_s$ and S-shaping capacitor $C_V$. AC and DC feedback to vertical deflection amplifier 54 is provided along signal lines 81 and 82.

The vertical parabola applied to terminal 48 is inverted at output terminal 38 and applied to the base of transistor Q4 to vary conduction in transistor Q4 at a vertical rate in a parabolic manner. The parabolic modulation of transistor Q4 produces a concurrent parabolic modulation of modulator voltage $V_m$, developed across modulator trace capacitor $C_m$. The parabolic modulation of voltage $V_m$ produces, in an inverted manner, the parabolic modulation of horizontal deflection current $i_H$ to provide side pincushion correction.

Static width adjustment is provided by coupling the wiper arm of a potentiometer 43 to noninverting input terminal 49 of differential amplifier 40. Correction for trapezoidal distortion of the raster is provided by the voltage developed at the junction of vertical deflection winding $L_V$ and sampling resistor $R_s$. This voltage generates a correction current $i_{tz}$ that is coupled to noninverting input terminal 49 via a resistor 37.

Negative feedback of modulation voltage $V_m$ to inverting input terminal 48 of differential amplifier 40 is provided via a resistor 47. This negative feedback significantly reduces waveform distortion and stabilizes the operation of differential amplifier 40, making it less sensitive to gain variations.

Collector supply voltage for transistor Q3 and DC biasing of the base of transistor Q4 is provided by the parallel connection of a resistor 41 to the +30 volt supply and a resistor 39 to the B+ supply of +131 volts. This parallel connection produces an effective supply voltage that is greater than the available +30 volt supply to permit proper biasing of the base of transistor Q4 at the extremes of modulation voltage $V_m$, near the beginning and end of vertical scan.

A high voltage generator 60 develops a +U ultor voltage to accelerate the electron beams of a picture tube, not illustrated in FIG. 1, onto the tube phosphor screen. The horizontal deflection retrace pulse voltage 19, developed at the collector of horizontal output transistor Q1, is applied to primary winding 21 of flyback transformer T1, stepped up in voltage by a high voltage winding comprising winding sections 22–24, rectified by diodes 25–27 to develop the +U ultor voltage. A surge current limiting resistor 28 is coupled between diode 25 and ultor terminal +U.

A resupply current $i_0$ flows into a resupply terminal 38 of the flyback transformer high voltage winding to replenish the charge in the ultor capacitance that is drawn from ultor terminal +U by the picture tube load. The +30 volt supply is coupled via resistors 31 and 32 to resupply terminal 38 for providing resupply current $i_0$. The junction of resistors 31 and 32 functions as the input to a conventional beam limiter circuit 35. A capacitor 33 filters the input voltage to the beam limiter circuit. In the normal range of beam current loading, prior to beam limiting, for resupply current levels between zero and 1400 microamperes, for example, beam limiter circuit 35 maintains the voltage at its input relatively constant.

Resupply current $i_0$ generates a voltage $V_{rs}$ at resupply terminal 38 that is representative of beam current loading on ultor terminal +U. A capacitor 34 provides horizontal rate filtering of voltage $V_{rs}$.

High voltage generator 60 exhibits an internal impedance which causes the +U ultor voltage to decrease with increasing beam current loading on the ultor terminal. The internal impedance behaves nonlinearly, exhibiting a generally greater impedance value at low beam current loading levels compared to the impedance value at high beam current loading levels.

Figure 2A:
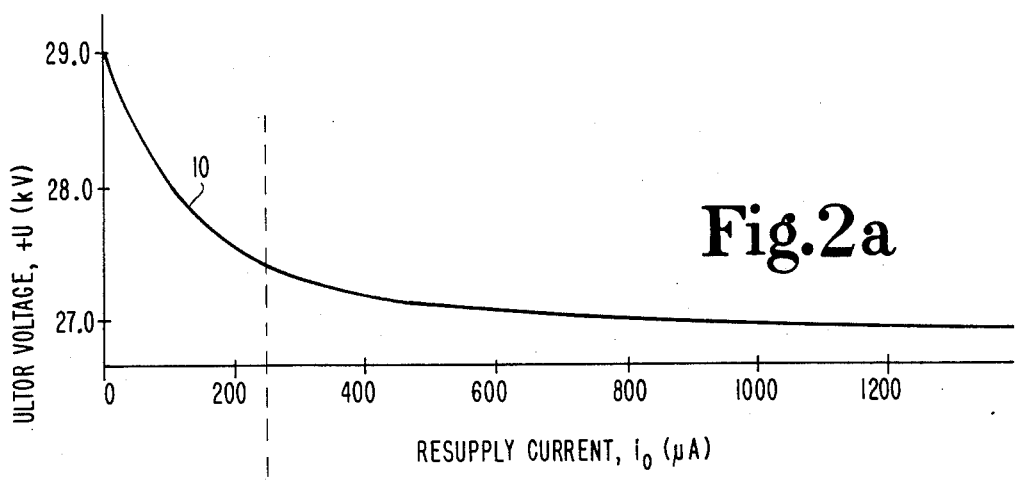

FIG. 2a illustrates a curve 10 of ultor voltage +U as a function of high voltage resupply current $i_0$. The slope $\alpha$ of curve 10 may be defined at any given value of resupply current as the fraction $\Delta U/\Delta i_0$. Thus the slope $\alpha$ of curve 10 is an indication of the internal impedance of high voltage generator 60 as a function of resupply current $i_0$ or of beam current loading.

The nonlinear nature of the internal impedance of high voltage generator 60 is discernible in curve 10 of FIG. 2a. The slope of curve 10 is substantially steeper for lighter beam current loading, at resupply current levels less than, for example, the level $I_1$. This is indicative of a relatively large high voltage generator impedance. For heavier beam current loading, at resupply current levels greater than than level $I_1$, the slope of curve 10 is relatively shallow. This is indicative of a relatively small high voltage generator impedance.

Raster width tends to increase as the ultor voltage decreases under increasing beam current loading. For relatively small changes in ultor voltage +U, the percentage increase in raster width is direclty proportional to the percentage decrease in ultor voltage +U.

To maintain the raster width relatively unchanged with changes in beam current loading, high voltage resupply current sense voltage $V_{rs}$ is coupled to diode modulator 30 to modulate the amplitude of horizontal deflection current $i_H$ in a manner that opposes the tendency of the raster width to change with beam current loading.

Figure 2B:
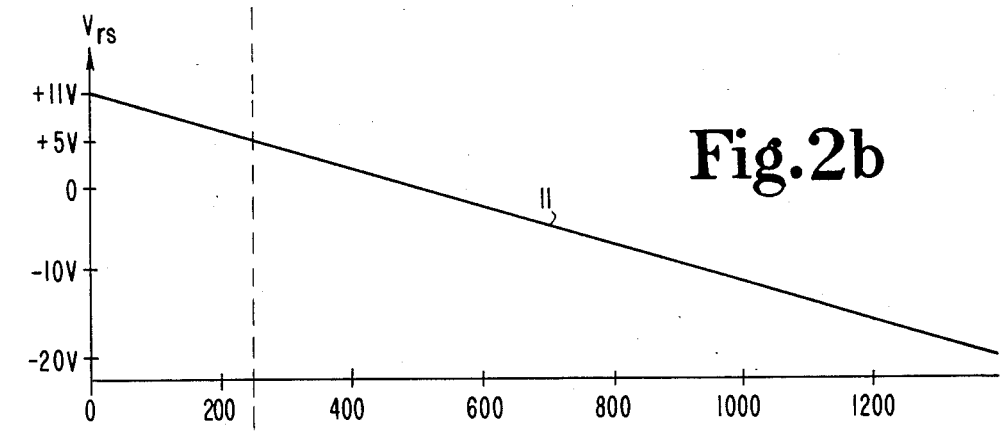

Beam current sense voltage $V_{rs}$ is illustrated in FIG. 2b as curve 11. Curve 11 is a linear ramp-shaped curve that decreases with increasing beam current loading and resupply current levels. Width modulation by ultor beam current loading is a nonlinear function of the loading, whereas sense voltage $V_{rs}$, coupled to diode modulator 30 to compensate for such width modulation, is a linear function of beam current loading. If voltage $V_{rs}$ were to be coupled to diode modulator 30 in a linear manner, accurate width compensation throughout the entire range of normal beam current loading levels would not be achievable.

In accordance with a feature of the invention, voltage $V_{rs}$ is applied to a nonlinear correction signal generating network 50 interposed between high voltage resupply terminal 38 and control circuit 70 of diode modulator 30. Nonlinear correction signal generating network 50 comprises a nonlinear impedance network that includes a resistive voltage divider, resistors 51 and 52, coupled between terminal 38 and inverting input terminal 48 of differential amplifier 40. The nonlinearity function of the impedance network is provided by a semiconductor element, diode 53, coupled in parallel with resistor 52. The anode of the diode is coupled to the junction of resistors 51 and 52 and the cathode is coupled to terminal 48.

Figure 2C:
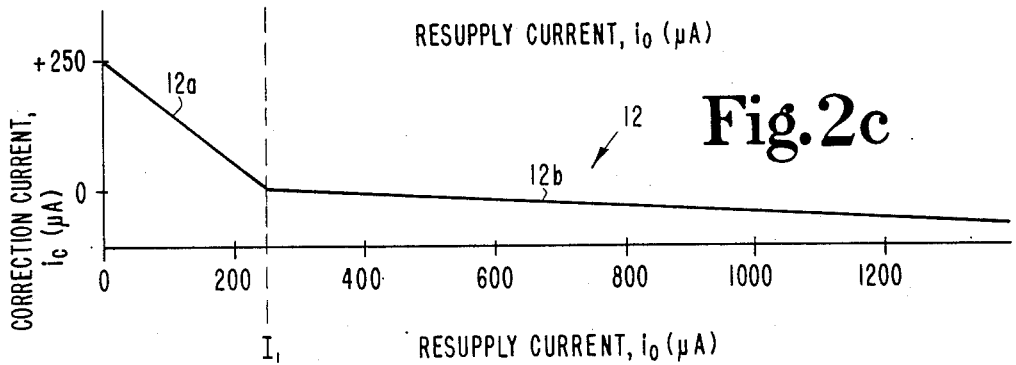

Network 50 converts sense voltage $V_{rs}$ into a nonlinear correction current $i_c$ that flows into the base of differential transistor Q3 via input terminal 48. A curve 12 of correction current $i_c$ as a function of a resupply current $i_0$ is illustrated in FIG. 2c. For light beam current loading, at resupply current levels less than level $I_1$ in FIGS. 2a–2c, sense voltage $V_{rs}$ is sufficiently high in value to forward bias diode 53, thereby bypassing voltage dividing resistor 52 and lowering the impedance of network 50. The portion 12a of curve 12 of correction current $i_c$, illustrated in FIG. 2c, therefore, exhibits a relatively steep slope for resupply currents less than level $I_1$. The steeper slope at the lighter beam current loading levels enables diode modulator 30 to provide greater modulation of the amplitude of line deflection current $i_H$ for a given change in beam current loading, to more closely track the greater internal impedance of high voltage generator 60.

For heavier beam current loading, at resupply current levels greater than $I_1$ in FIGS. 2a–2c, sense voltage $V_{rs}$ is below the value necessary to maintain diode 53 in conduction. Voltage dividing resistor 52 remains unbypassed, raising the impedance of network 50. As illustrated by the portion 12b of curve 12 in FIG. 2c, the increased impedance of network 50 at resupply current levels greater than $I_1$ produces a relatively shallow sloped curve for correction current $i_c$. Diode modulator 30 provides less modulation of the amplitude of horizontal deflection current $i_H$ at the higher beam current loading levels for a given change in beam current loading. This more closely tracks the generally shallow slope of ultor voltage curve 10 at the higher resupply current levels.

The nonlinear response of diode modulator 30 to high voltage resupply sense voltage $V_{rs}$ advantageously enables the modulation of horizontal deflection current $i_H$ to track the nonlinear changes in ultor voltage with changes in beam current loading, to maintain a relatively constant raster width throughout the normal range of beam current loading.

In accordance with another aspect of the invention, the design of control circuit 70 of diode modulator 30 enables modulation voltage $V_m$ to accurately and closely follow the signal waveforms at either input terminal of differential amplifier 40. Output transistor Q4 advantageously comprises a noninverting, unity voltage gain, emitter-follower stage having the output emitter terminal of PNP transistor Q4 coupled to modulator trace capacitor $C_m$ and the input base terminal coupled to differential amplifier output terminal 38, at the collector of inverting differential transistor Q3.

Positive going parabola voltage $V_{pb}$ is coupled to inverting terminal 48 as a positive going parabola voltage 17 that is inverted by differential amplifier 40 to produce a negative going parabola voltage 18 at the base of emitter-follower transistor Q4. Emitter-follower transistor Q4, being a noninverting amplifier, varies its conduction in such a manner as to produce a negative going, parabolic modulation of voltage $V_m$ by the process of shunting current away from modulator trace capacitor $C_m$. The current for modulator capacitor $C_m$ is obtained from the B+ supply terminal via primary winding 21 of flyback transformer T1 and horizontal deflection circuit 20.

Transistor Q4 shunts a maximum amount of current near the center of vertical scan. Because of the differential amplifier, emitter-follower configuration, a low gain transistor Q4 may be used, even though as a consequence relatively large base current must flow in transistor Q4 near the center of vertical scan. With the base of transistor Q4 coupled to the output of differential amplifier 40, amplifier transistor Q3 sinks the base current of transistor Q4. Amplifier transistor Q3 is easily capable of sinking the base current, even near the center of vertical scan when the base current is maximum. The source of base current in transistor Q4 is modulator capacitor $C_m$, which capacitor is readily capable of supplying such current, provided sufficient replenishing current is available from the B+ supply terminal.

A contrasting, less advantageous situation exists when output transistor Q4 is configured as an inverting, common-emitter stage, using an NPN type transistor, for example. The collector of the NPN transistor is coupled to the modulator trace capacitor. The base is coupled to a DC voltage source via a pull-up resistor and is coupled to the output of an amplifier which applies a positive going vertical rate parabola voltage. At the center of vertical scan, when the shunting current in the collector of the common-emitter stage is at a maximum, the relatively large base current must be supplied by the DC supply via the pull-up resistor, rather than by the modulator trace capacitor.

An additional advantage of the differential amplifier, emitter-follower configuration is the capability of a relatively fast voltage slew rate. The fast voltage slew rate enables transistor Q4 to rapidly shunt current away from modulator capacitor $C_m$ near the beginning of vertical scan, when parabola voltage 18 is decreasing rapidly.

Use of a differential amplifier configuration provides relatively good output immunity to ripple and loading effects on the −24 volt supply. This supply, together with resistor 44, forms the current sink for differential amplifier 40. Resistor 45 interposed between the current sink and the emitter of inverting transistor Q3 lowers the gain for signals applied to inverting input terminal 48. This lowering of the gain is desirable when modulator voltage $V_m$ is fed back and applied to terminal 48 and then summed with vertical rate parabola voltage $V_{pd}$ for providing negative feedback. Voltage $V_m$ includes a horizontal rate ripple component in addition to the vertical rate parabola, whereas voltage $V_{pd}$ does not include a horizontal rate ripple component. Absent the presence of emitter resistor 45, the uncompensated horizontal rate ripple at terminal 48 could undesirably drive transistor Q3 into cutoff during each horizontal cycle.

Width control potentiometer, being coupled to noninverting input terminal 49 via the wiper arm of the potentiometer, acts as a voltage divider for input signals coupled to terminal 49. Width adjustment of potentiometer 43 produces concurrent changes in the amplitude of these input signals. Advantageously, then, beam current correction current $i_c$ and parabola voltage $V_{pb}$ are coupled to the other input terminal, inverting input terminal 48. This arrangement avoids width adjustment related changes in correction current $i_c$ and parabola voltage $V_{pb}$. Trapezoidal correction current $i_{tz}$, although coupled to noninverting input terminal 49 and thereby subject to width adjustment changes, provides relatively small amounts of correction to begin with. Thus, any width adjustment changes in current $i_{tz}$ is not significantly objectionable.

What is claimed is:
1. A raster width control circuit comprising:
a high voltage generator for generating an ultor voltage to accelerate an electron beam of a picture tube, said high voltage generator drawing a resupply current in accordance with beam current loading by said picture tube;
deflection means for generating line and field deflection currents in respective line and field deflection windings to enable said electron beam to scan a raster;

means for modulating the amplitude of said line deflection current;

means for generating a sense voltage representative of said resupply current; and means responsive to said sense voltage and coupled to said modulating means for generating a nonlinear correction signal to provide modulation of the amplitude of said line deflection curent for a given change in beam current loading that is greater within a first range of normal beam current loading levels, than within a second range of levels.

2. A circuit according to claim 1 wherein said nonlinear correction signal generating means comprises a nonlinear impedance network.

3. A circuit according to claim 2 wherein said nonlinear impedance network comprises a voltage divider and a semiconductor element coupled to an intermediate point within said voltage divider.

4. A circuit according to claim 2 wherein said high voltage generator includes a high voltage transformer with a high voltage winding having a first terminal coupled to said picture tube and a resupply terminal coupled to said nonlinear impedance network, into which resupply terminal said resupply current flows.

5. A circuit according to claim 2 wherein said modulating means comprises an amplifier and an output stage coupled to said amplifier and to said deflection means, said nonlinear impedance network being coupled to an input of said amplifier.

6. A circuit according to claim 5 wherein said modulating means comprises a side pincushion correction modulator and further including a field rate parabola generator having an output coupled to an input of said amplifier.

7. A circuit according to claim 1 wherein said high voltage generator exhibits a nonlinear impedance of generally greater impedance value within said first range of normal beam current loading levels than the impedance value within said second range.

8. A side pincushion correction circuit providing accurate amplitude modulation of a horizontal deflection current, comprising:

a horizontal deflection circuit for generating said horizonal deflection current;

a diode modulator including a modulator trace capacitance coupled to said horizontal deflection circuit for modulating the amplitude of said horizontal deflection current;

a control circuit for said diode modulator comprising:

first and second differentially connected transistors forming a differential amplifier having an inverting input terminal at the base terminal of one of the two transistors and a noninverting input terminal at the base terminal of the other transistor;

a noninverting, unity voltage gain, emitter-follower stage for shunting said modulator trace capacitance, said emitter-follower stage including a third transistor having an emitter terminal coupled to said modulator trace capacitance and a base terminal coupled to an output of said differential amplifier at a collector terminal of said first transistor;

a vertical rate parabola voltage generator coupled to one of the input terminals of said differential amplifier for varying the voltage of said modulator capacitance at a vertical rate in a parabolic manner to similarly modulate said horizontal deflection current for providing side pincushion correction; and means for providing negative feedback from an output of said emitter-follower stage to said differential amplifier.

9. A circuit according to claim 8 wherein the emitter terminals of said first and second transistors are coupled together via a resistance.

10. A circuit according to claim 8 wherein the base terminal of said first transistor is the inverting input terminal of said differential amplifier.

11. A circuit according to claim 10 wherein said vertical rate parabola generator comprises a vertical deflection circuit including a vertical deflection winding and an S-shaping capacitance coupled to said vertical deflection winding and to the inverting input terminal of said differential amplifier for applying a positive going vertical rate parabola voltage to said inverting input terminal.

12. A circuit according to claim 11 including a high voltage generator for generating an ultor voltage, said high voltage generator drawing a resupply current in accordance with beam current loading of said high voltage generator, and means coupled to an input terminal of said differential amplifier for generating a correction current representative of said beam current loading for modulating the amplitude of said horizontal deflection current in accordance therewith.

13. A circuit according to claim 12 wherein said correction current generating means comprises a nonlinear impedance network for providing modulation of the amplitude of said horizontal deflection current for a given change in beam current loading that is greater within a first range of normal beam current loading levels than within a second range of levels.

14. A circuit according to claim 11 including a static width control potentiometer coupled to a DC voltage source and to the noninverting input terminal of said differential amplifier.

15. A circuit according to claim 14 wherein said vertical deflection circuit includes a current sampling resistor coupled to said vertical deflection winding and to the noninverting input terminal of said differential amplifier for modulating the amplitude of said horizontal deflection current to provide trapezoidal raster correction.

16. A circuit according to claim 15 including a high voltage generator for generating an ultor voltage, said high voltage generator drawing a resupply current in accordance with beam current loading of said high voltage generator, and means coupled to the inverting input terminal of said differential amplifier for generating a correction current representative of said beam current loading for modulating the amplitude of said horizontal deflection current in accordance therewith.

17. A circuit according to claim 16 wherein said correction current generating means comprises a nonlinear impedance network for providing modulation of the amplitude of said horizonal deflection current for a given change in beam current loading that is greater within a first range of normal beam current loading levels than within a second range of levels.

* * * * *